Feb. 16, 1965     B. RAPSON     3,169,854
METHOD OF IMPROVING ARC STABILITY WHEN ARCING BETWEEN
AN ELECTRODE AND A POOL OF MOLTEN METAL
Filed March 26, 1962
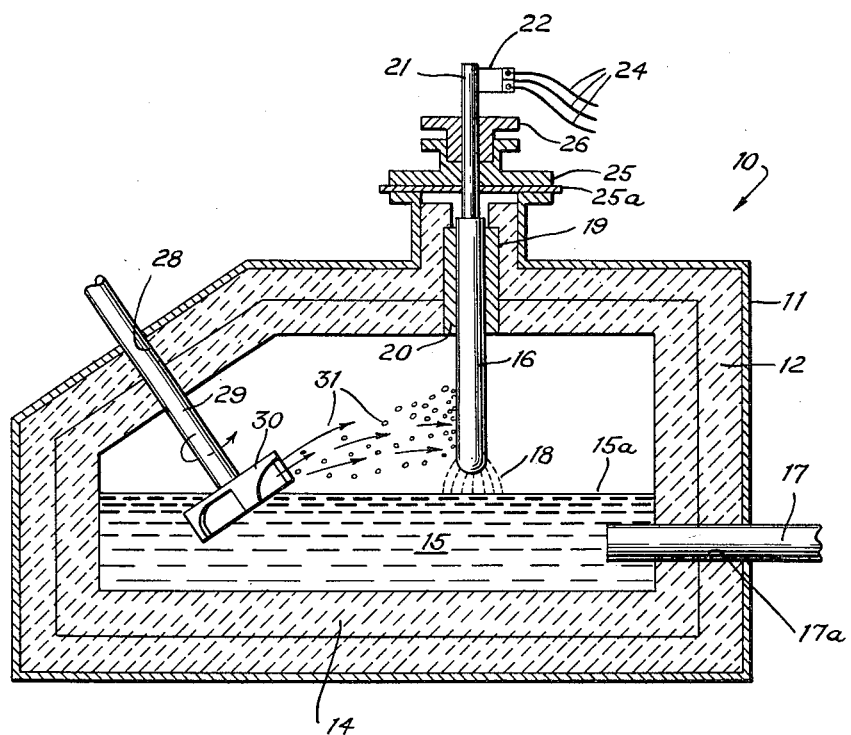
INVENTOR.
BRYAN RAPSON
BY
Robert S. Dunham
ATTORNEY

United States Patent Office 3,169,854
Patented Feb. 16, 1965

3,169,854
METHOD OF IMPROVING ARC STABILITY WHEN ARCING BETWEEN AN ELECTRODE AND A POOL OF MOLTEN METAL
Bryan Rapson, Arvida, Quebec, Canada, assignor to Aluminum Laboratories Limited, Montreal, Quebec, Canada, a corporation of Canada
Filed Mar. 26, 1962, Ser. No. 182,563
1 Claim. (Cl. 75—10)

This invention relates to forming and/or maintaining an arc between an electrode and a body of molten metal. In accordance with one embodiment, this invention relates to a method of supplying heat to a body of molten metal by striking an arc between an electrode and the body of molten metal under conditions such that the heat generated by the resulting arc is transferred to the body of molten metal. More particularly, this invention relates to improving the stability of an arc struck between an electrode, such as a consumable electrode, and a pool of molten metal.

Although the practice of this invention is generally applicable to improving the stability of an arc struck between an electrode and a pool of molten metal, this invention is particularly applicable to improving the stability of an arc struck between a carbon electrode and a pool of molten aluminum-containing metal.

In one method for the refining of aluminum, the so-called subhalide or monohalide (monochloride) process, an arc is struck between a carbon electrode and a body of molten aluminum so as to maintain the molten aluminum at a desired elevated temperature and in the molten state. In the subhalide process, aluminum-containing metal is contacted at an elevated temperature, e.g., above about 1000° C., with a gaseous aluminum trihalide, such as aluminum trichloride, in a suitable contacting zone or converter under conditions such that the aluminum in the metal reacts with the gaseous aluminum trihalide to form the corresponding gaseous aluminum monohalide in accordance with the chemical equation:

$$AlX_3 + 2Al \rightarrow 3AlX$$

wherein X is a halogen atom, such as a halogen atom selected from the group consisting of fluorine, chlorine and bromine. The resulting formed hot gaseous aluminum monohalide is recovered and cooled in a separate treating zone or decomposer. Upon reduction in temperature, e.g., to a temperature in the range 700-800° C., the aluminum monohalide undergoes decomposition in accordance with the chemical equation:

$$3AlX \rightarrow 2Al + AlX_3$$

The resulting produced, substantially pure aluminum is recovered in molten form and the resulting formed gaseous aluminum trihalide is separately recovered and advantageously returned to the contacting zone or converter to contact additional aluminum-containing metal for the production of additional aluminum monohalide.

In the operation of the preferred design of the decomposer a body of molten aluminum is maintained therein at a relatively low temperature with respect to the hot gaseous aluminum monohalide in contact therewith so as to effect cooling and decomposition of the aluminum monohalide to yield aluminum and aluminum trihalide. In order to prevent freezing or solidification of the molten aluminum within the decomposer during interruption in the service of the other operating units in the overall refining process and in order to provide a body of molten aluminum within the decomposer during start-up, means are provided for supplying heat to the aluminum within the decomposer so as to form and to maintain, as desired, a body of molten aluminum therein.

The heating means employed is an electrode supplied with a suitable source of voltage and adapted and arranged to strike an arc between the electrode and the body of aluminum within the decomposer. Difficulty, however, has been experienced in operating and maintaining such a heating means. Difficulty arises in producing and maintaining a stable arc between the electrode and the body of aluminum because of the reactions between the aluminum and the electrode made of carbon and/or graphite. Difficulty is also experienced in maintaining a stable arc because the relatively low density of aluminum permits the molten aluminum to be pushed away from the arc with resulting interruption of arcing. Although arc stability can be improved by reducing the diameter of the electrode, this technique suffers from the disadvantage of higher electrode consumption in terms of length per unit operating time. A higher rate of electrode consumption necessitates more frequent replacement of the electrode, an undesirable situation.

Also, when striking and maintaining an arc between a carbon electrode and a body of molten aluminum in the presence of a gaseous aluminum trihalide, such as gaseous aluminum trichloride, difficulty has been experienced in maintaining a stable arc even when employing voltages as high as 150 volts and varying amounts of inductance in the arc-producing circuit. The resulting arc instability necessitates frequent raising and lowering of the electrode as arc conditions go from short circuit to open circuit. Under the short circuit conditions the power input is low while drawing excessively high currents at a very poor power factor. It is theorized that arc instability arises due to the fact that aluminum vapor which would normally conduct the arc current in the absence of the gaseous aluminum trihalide (aluminum trichloride) was being removed as quickly as it was formed in the presence of gaseous aluminum trihalide (aluminum trichloride) through the formation of aluminum monohalide (aluminum monochloride) in accordance with the chemical equation:

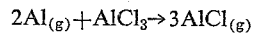

$$2Al_{(g)} + AlCl_3 \rightarrow 3AlCl_{(g)}$$

It is therefore an object of this invention to improve arc stability when arcing between an electrode and a pool of molten metal.

More particularly, it is an object of this invention to provide an improved method, involving arcing, for supplying heat to a body of molten metal.

Still another object of this invention is to provide an improved method for operating a decomposer for carrying out the decomposition reaction in the aluminum monohalide process for the refining of aluminum wherein hot gaseous aluminum monohalide is contacted with a body of relatively cool molten aluminum to effect cooling with resulting decomposition of the aluminum monohalide into elemental aluminum and corresponding gaseous aluminum trihalide.

Yet another object of this invention is to provide a method of improving the stability of an arc struck between an electrode, such as a carbon electrode, and a pool of molten aluminum.

Yet another object of this invention is to provide a method of improving arc stability between a carbon electrode and a body of molten aluminum in the presence of gaseous aluminum trichloride.

How these and other objects of this invention are achieved will become apparent in the light of the accompanying disclosure made with reference to the accompanying drawing which schematically illustrates a decomposer provided with a carbon electrode disposed in arcing position with respect to a body of molten aluminum and operated in accordance with this invention.

In accordance with this invention improved stability of an arc struck between an electrode and a pool of molten metal is obtained by introducing into said arc a stream of molten metal. More particularly and in accordance with an embodiment of the practice of this invention directed to the refining of aluminum, the stability of an arc struck between an electrode, such as a carbon electrode, and a pool of molten aluminum-containing metal is improved by directing into the arc a stream of molten aluminum or molten aluminum-containing metal, preferably generated from the pool of molten aluminum-containing metal. In accordance with still another preferred embodiment of the practice of this invention wherein an arc is struck between a carbon electrode and a pool of molten aluminum, arc stability is improved by forming or depositing a stream of molten aluminum on the surface of the carbon electrode and directing or flowing the thus-formed stream of molten aluminum along the surface of the carbon electrode into the arc struck between the carbon electrode and the pool of molten aluminum. The stream of molten aluminum, a downwardly flowing, continuous liquid stream or a stream comprising a flow of droplets, directed to the arc, overcomes and/or avoids any deficiency of an electrical conductor, vaporized aluminum, in the region of the arc.

In still another preferred practice of this invention wherein an arc is struck between a carbon electrode and a pool of molten aluminum, the stream of molten aluminum directed into the arc is created by generating a spray of droplets of molten aluminum from the pool of molten aluminum and directing or causing at least a portion of the spray onto the surface of the carbon electrode. The flow of molten aluminum thus formed on the outer surface of the carbon electrode moves or is directed as a stream into the arc struck between the electrode and the pool of molten aluminum.

The stream of molten metal directed into the arc in accordance with this invention to improve arc stability may be created by any suitable means and be derived from any suitable source. It is preferred to create a stream of molten metal by generating a spray of droplets of molten metal by suitable means, such as by means of a splasher or impeller, acting upon the body of molten metal so that at least a portion of the spray impinges upon the carbon electrode and flows therealong into the arc. Desirably, the spray of molten metal is generated from the body of molten metal which acts in conjunction with the electrode to from the arc. If desired, however, an extraneous source or body of molten metal may be employed to generate and/or to supply the stream of molten metal which is directed into the arc.

Referring now to the drawing which schematically illustrates the process, and means for carrying out the same, of this invention as applied to the refining of aluminum involving the decomposition of gaseous aluminum monochloride into elemental aluminum and gaseous aluminum trichloride in the presence of molten aluminum, the decomposer, generally indicated by the reference numeral 10, is made up of an outer steel shell 11, an intermediate lining of refractory material 12 and an inner lining of refractory material 14. A body 15 of molten aluminum is contained within decomposer 10. The upper surface of body 15 of molten aluminum is indicated by reference numeral 15a. An electrode 16 made of carbon or graphite or a mixture thereof is disposed in arcing relationship with body 15 of molten aluminum. The arc struck between electrode 16 and body 15 of molten aluminum is indicated by reference numeral 18.

Carbon electrode 16 enters decomposer 10 via electrode inlet 19 provided in the roof of decomposer 10. A graphite lining 20 is provided in opening 19 to reduce or to avoid interference with the movement of the electrode 16 therethrough due to freezing and adhesion of metallic particles in inlet 19. Electrode 16 is carried on metal conductor bar 21 which is supplied with voltage via electrically conductive clamp 22 and conductors 24 to supply voltage to electrode 16 to strike an arc with body 15 of molten aluminum. Graphite electrode 17, provided with suitable electrical connections, not shown, entering decomposer 10 via electrode inlet 17a and immersed in body 15 of molten aluminum completes the electrical circuit. Means, not shown, are provided for raising and lowering conductor bar 21 together with electrode 16 and for carrying electrical current away from the body of molten aluminum 15. Inlet 19 through which electrode 16 enters decomposer 10 is maintained sealed by suitable coverings comprising electrode flange (removable) 25, electrical insulator 25a and gland or stuffing box 26 which, although sealing off the interior of decomposer 10, permit the up and down movement of electrode 16 and conductor 21 within decomposer 10.

Another opening 28 is provided in the side wall of decomposer 10 and a shaft 29 capable of rotation extends through opening 28 into decomposer 10. A vaned impeller 30 made of suitable material, such as graphite, boron nitride, silicon carbide or silicon nitride, is fixed to the end of shaft 29 and partially immersed within the body of molten aluminum 15. Gas tight sealing means, not shown, are provided between shaft 29 and opening 28. Upon rotation of shaft 29 impeller 30 is caused to rotate and to splash a body of molten aluminum within decomposer 10. The resultant splashing generates a spray 31 of droplets of molten aluminum some of which, as indicated, impinge upon the surface of electrode 16.

In the operation of the apparatus illustrated in the drawing a shower or spray 31 of droplets of molten aluminum is created upon rotation of impeller 30. Relatively large quantities of spray 31 of molten aluminum hit the outside surface of electrode 16 to form a downwardly flowing stream of molten aluminum thereon, the stream of molten aluminum being continuous or discontinuous. The thus-formed stream of molten aluminum on electrode 16 flows downwardly and on leaving the bottom end of electrode 16 provides a continuous mechanism for restriking arc 18. The high current flowing through arc 18 causes vaporization of all or a part of the stream of molten aluminum metal entering arc 18 from electrode 16 to create the essential ionization to maintain arc 18. It has been observed in practice that by employing the operations described hereinabove and the apparatus illustrated in the drawing it has been possible to maintain an arc in an aluminum trichloride atmosphere almost indefinitely despite rapid fluctuations in the arc current. The length of the arc, from about 0.5 inch to about 1.5 inches, provides flexibility in the positioning of the electrode with respect to surface 15a of body 15 of molten aluminum 15 as well as a high power factor.

It has also been found desirable in carrying out operations in accordance with this invention to maintain a voltage in the order of about 75–150 volts, on electrode 16 at all times while splashing. This applies even when heating is not required, in which case electrode 16 is raised to break arc 18. By maintaining a voltage on electrode 16 the risk of a major short circuit due to particles of splashed aluminum metal bridging across to ground at the top of the electrode inlet 19 is eliminated. Any small paths to ground so formed are thus quickly vaporized.

In the practices of this invention as applied to the decomposition operation in the aluminum monohalide process for the refining of aluminum the splashing of aluminum metal within the decomposer in addition to serving to create a spray or flow of droplets onto the electrode and ultimately into the arc to improve arc stability also serves to improve contact between the relatively cool molten aluminum and the relatively hot gaseous aluminum monohalide (aluminum monochloride) introduced into the decomposer for decomposition into elemental aluminum and gaseous aluminum trihalide (aluminum trichloride).

The following examples are illustrative of the practices of this invention:

*Example No. 1*

A decomposer provided with a 2 inch diameter graphite electrode and a 14 inch diameter vaned impeller or splasher, as indicated in the accompanying drawing, was employed in the aluminum monohalide process for the refining of aluminum. A body of molten aluminum was maintained in the decomposer and an arc was struck between the graphite electrode and the body of molten aluminum to maintain the molten aluminum at the desired operating temperature. At a flow of gaseous aluminum trichloride at a rate of about 150 pounds per hour through the decomposer and with the splasher or impeller operating at 300 r.p.m. to create a spray of droplets of molten aluminum to impinge upon the electrode and with an arc power input of 35 kw., an arc was maintained between the electrode and the body of molten aluminum for nearly 100% of the time during the test run which was carried out over a period of 1 hour and 40 minutes. Electrode consumption during the test run amounted to 2.8 inches per hour and the rate of temperature rise of the molten aluminum due to the heat generated by the arc amounted to 15 degrees centigrade per hour.

*Example No. 2*

The same decomposer described in connection with Example No. 1 was satisfactorily employed for about 50 minutes under substantially the same conditions also described in Example No. 1 without any throughput of gaseous aluminum trichloride.

*Example No. 3*

The same decomposer described in connection with Example No. 1 was operated without any throughput of gaseous aluminum trichloride and without rotating the impeller so as to provide a spray of droplets of molten aluminum to impinge the electrode for eventual flow into the arc. During this test attempts were made to form an arc between the carbon electrode and the body of molten aluminum. These attempts were not successful in creating an arc since the electrode in the absence of the stream of molten aluminum flowing therefrom went directly to open circuit to short circuit.

Examples No. 1 and No. 3 indicate the marked effect the stream of molten aluminum from the electrode into the arc has upon arc stability. In Example No. 1 this stream of molten aluminum permitted the attainment of a stable arc during which power was on 100% of the time whereas Example No. 3 indicates that in the absence of this stream of molten aluminum a stable arc was not obtainable and attempts to strike an arc were unsuccessful.

*Example No. 4*

A decomposer similar in construction to that illustrated in the accompanying drawing and provided with a 3 inch diameter carbon electrode was supplied with a flowthrough of gaseous aluminum trichloride at a rate in the range 100–150 pounds per hour. The decomposer was operated at impeller speeds in the range from about 220–400 r.p.m. Under these conditions a stable arc was obtained. While the impeller was in operation so as to direct a spray of droplets of molten aluminum onto the electrode and eventually into the arc, the arc was stable over the open circuit voltage range of from about 74 volts to about 123 volts. It was observed, however, that when the impeller was stopped a very unstable arc resulted, as evidenced by frequent open circuits.

As will be apparent to those skilled in the art in the light of the foregoing disclosure many modifications, alterations and changes are possible in the practice of this invention without departing from the spirit or scope thereof.

I claim:

In an operation wherein an arc is maintained in an aluminum trihalide-containing atmosphere between an electrode and a pool of molten aluminum to supply heat to said pool of aluminum the improvement in combination therewith which comprises improving the stability of said arc by directing a stream of molten aluminum to impinge at least in part on said electrode to cause a stream of molten aluminum to flow along the surface of said electrode into said arc whereby the stream of molten aluminum is vaporized in the arc to provide arc stability due to the ionization of the vaporized aluminum within the arc.

References Cited in the file of this patent

UNITED STATES PATENTS

| | | |
|---|---|---|
| 430,453 | Willson | June 17, 1890 |
| 491,394 | Willson | Feb. 7, 1893 |
| 2,702,239 | Gilbert et al. | Feb. 15, 1955 |
| 2,909,422 | Schwabe | Oct. 20, 1959 |
| 2,914,398 | Johnston et al. | Nov. 24, 1959 |
| 2,974,032 | Grunert et al. | Mar. 7, 1961 |